United States Patent
Saeki

(10) Patent No.: US 6,831,696 B1
(45) Date of Patent: Dec. 14, 2004

(54) EXPOSURE CONTROL OF AN IMAGING APPARATUS USING A PLURALITY OF PHOTOMETRY FRAMES

(75) Inventor: Takayuki Saeki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 815 days.

(21) Appl. No.: 09/703,817

(22) Filed: Nov. 2, 2000

(30) Foreign Application Priority Data

Nov. 5, 1999 (JP) .......................................... 11-314865

(51) Int. Cl.⁷ ............................................. H04N 5/228
(52) U.S. Cl. ................ 348/362; 348/229.1; 348/222.1; 348/220.1
(58) Field of Search .......................... 348/220.1, 221.1, 348/222.1, 229.1, 362

(56) References Cited

U.S. PATENT DOCUMENTS

| | | | | |
|---|---|---|---|---|
| 5,353,058 A | * | 10/1994 | Takei ........................... | 348/363 |
| 5,376,964 A | * | 12/1994 | Soga et al. ............... | 348/229.1 |
| 5,585,844 A | * | 12/1996 | Hieda et al. .............. | 348/224.1 |
| 5,703,644 A | * | 12/1997 | Mori et al. ................. | 348/363 |
| 5,831,676 A | * | 11/1998 | Takahashi et al. .......... | 348/362 |
| 6,570,620 B1 | * | 5/2003 | Yoshimura et al. ......... | 348/362 |

* cited by examiner

*Primary Examiner*—Ngoc-Yen Vu
*Assistant Examiner*—Kelly L. Jerabek
(74) *Attorney, Agent, or Firm*—Fitzpatrick, Cella, Harper & Scinto

(57) ABSTRACT

It is an object of this invention to provide an image pickup apparatus capable of suitable appropriate exposure control even when objects having extremely different luminance contrasts exist at the same field angle. The invention provides an image pickup apparatus including an integral circuit and a control circuit. The integral circuit calculates an average value a1 of photometry luminance integral data of all of m×n divided photometry frames, and an average value a2 of photometry luminance integral data of x divided photometry frames sampled in descending order of luminances from the m×n divided photometry frames. When the difference between the average values a1 and a2 exceeds a predetermined threshold value z, the control circuit performs correction of decreasing an appropriate target value of exposure control in accordance with the value of (a2−a1).

7 Claims, 6 Drawing Sheets

PRIOR ART

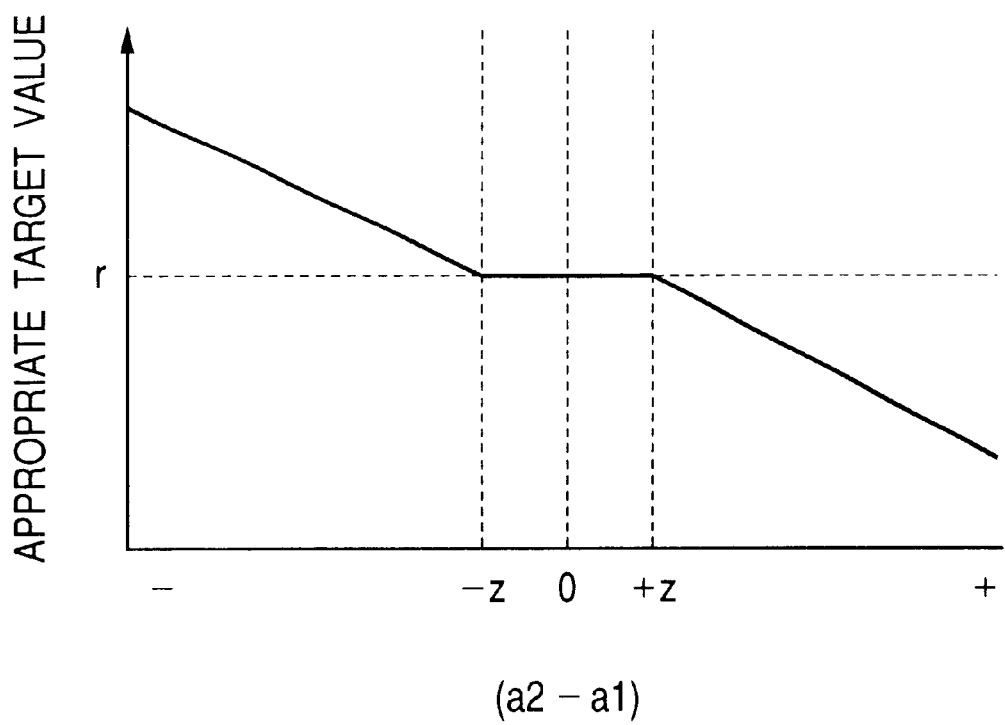

EXPOSURE CONTROL OF AN IMAGING APPARATUS USING A PLURALITY OF PHOTOMETRY FRAMES

BACKGROUND OF THE INVENTION

1. Field of the Invention

The present invention relates to an image pickup apparatus, method and computer-readable recording medium and, more particularly, to an image pickup apparatus, image pickup method, and computer-readable recording medium which can implement suitable appropriate exposure control even when objects having extremely different luminance contrasts exist at the same field angle.

2. Related Background Art

Conventionally, "center-weighted photometry" is extensively used as a photometry system for exposure control. In this "center-weighted photometry", as shown in FIG. 1, the average luminance signal level of an entire frame (inside a whole screen frame 201) is calculated by integration. Similarly, the average luminance signal level of a central portion (inside a center frame 202) is calculated by integration. These signal levels are combined to generate an exposure evaluation signal attaching importance to an object (inside the center frame 202) in the center of the screen, thereby performing photometry.

This "center-weighted photometry" conventionally widely used, however, is based on the assumption that a main object is present in the center of the screen. Therefore, if a main object exists in a position deviated from the screen central portion (e.g., inside the center frame 202), photometry (exposure control) is performed for an object other than this main object.

For example, if, as shown in FIG. 2, the dress of a person in black is present in the center of the screen and his or her face is in the upper central portion, exposure is so controlled that the black clothes in the center are appropriately exposed. Consequently, control is so performed as to open the iris, and the face of the person as a main object is overexposed. Note that FIGS. 1 and 2 are views for explaining the exposure control operation of a conventional image pickup apparatus.

Also, if objects having extremely different luminance contrasts exist in the same screen, exposure is controlled such that an object in the center of the screen is fixedly accentuated. Accordingly, a target object is excessively underexposed or overexposed.

As described above, the conventional image pickup apparatus controls exposure for an object present in the center of the screen. Therefore, if objects having exceptionally different luminance contrasts exist in the same screen, a target object is extremely underexposed or overexposed.

SUMMARY OF THE INVENTION

It is an object of the present invention to provide an image pickup apparatus, image pickup method, and computer-readable recording medium capable of suitable appropriate exposure control even when objects having excessively different luminance contrasts exist at the same field angle.

To achieve the above object, according to an aspect of the present invention, there is provided an image pickup apparatus comprising an image pickup region including a plurality of divided photometry frames, first calculating means for calculating an average value a1 of a predetermined number of divided photometry frames in the image pickup region, second calculating means for calculating an average value a23 of a smaller number of divided photometry frames than the predetermined number in the image pickup region, and exposure control means for controlling exposure by using signals from the first and second calculating means.

According to another aspect, there is provided an image pickup apparatus comprising an image pickup region including a plurality of divided photometry frames, an integral circuit for calculating an average value a1 of a predetermined number of divided photometry frames in the image pickup region, and an average value a23 of a smaller number of divided photometry frames than the predetermined number in the image pickup region, and a control circuit for controlling exposure on the basis of an output signal from the integral circuit.

According to still another aspect, there is provided a method of controlling an image pickup apparatus including an image pickup region having a plurality of divided photometry frames, comprising the first calculation step of calculating an average value a1 of a predetermined number of divided photometry frames in the image pickup region, the second calculation step of calculating an average value a23 of a smaller number of divided photometry frames than the predetermined number in the image pickup region, and the exposure control step of controlling exposure by using the average values a1 and a23.

According to still another aspect, there is provided a storage medium storing a control program for controlling an image pickup apparatus including an image pickup region having a plurality of divided photometry frames, the control program comprising a first code of controlling the apparatus to calculate an average value a1 of a predetermined number of divided photometry frames in the image pickup region, a second code of controlling the apparatus to calculate an average value a23 of a smaller number of divided photometry frames than the predetermined number in the image pickup region, and a third code of controlling the apparatus to control exposure by using the average values a1 and a23.

According to still another aspect, there is provided a storage medium storing a control program for controlling an image pickup apparatus including an image pickup region having a plurality of divided photometry frames, the control program comprising a first code of calculating an average value a1 of a predetermined number of divided photometry frames in the image pickup region, a second code of calculating an average value a23 of a smaller number of divided photometry frames than the predetermined number in the image pickup region, and a third code of controlling exposure by using the average values a1 and a23.

Other objects, features and advantages of the invention will become apparent from the following detailed description taken in conjunction with the accompanying drawings.

BRIEF DESCRIPTION OF THE DRAWINGS

FIG. 8 is a graph showing a change in an appropriate target value as a function of the value of (a2−a1) in the second embodiment.

DESCRIPTION OF THE PREFERRED EMBODIMENTS

Embodiments of the present invention will be described in detail below with reference to the accompanying drawings.

Figure 3:
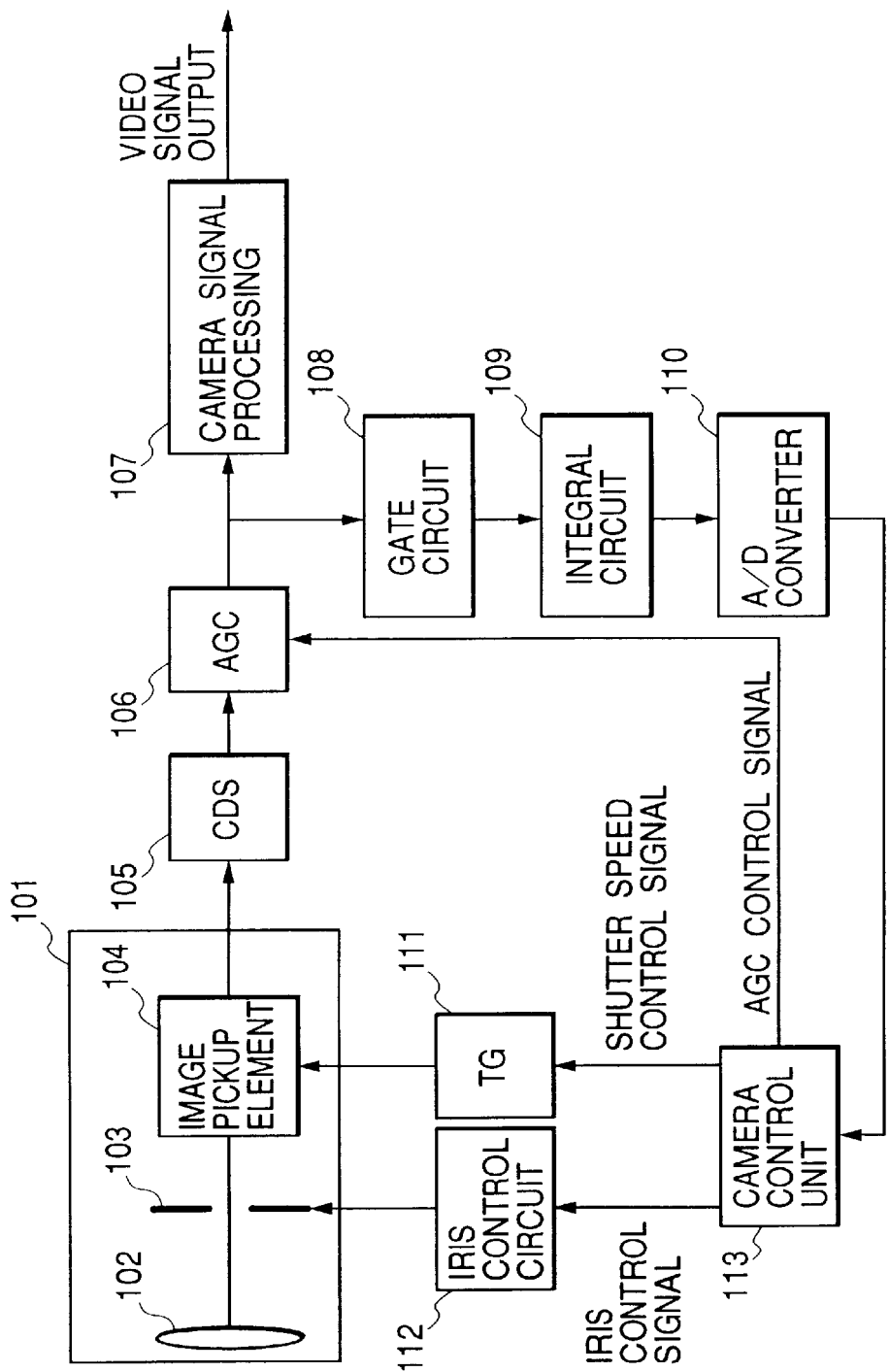
FIG. 3 is a block diagram showing the arrangement of an image pickup apparatus of the present invention.

FIG. 3 is a block diagram showing the arrangement of a common image pickup apparatus of the first and second embodiments of the present invention.

As shown in FIG. 3, this image pickup apparatus of these embodiments comprises a lens unit 101, a lens 102, an iris 103, an image pickup element 104, a CDS (Correlation Double Sampling) 105, an AGC (Automatic Gain Control) 106, a camera signal processing unit 107, a gate circuit 108, an integral circuit 109, an A/D converter 110, a timing generator (TG) 111, an iris control circuit 112, and a camera control unit 113.

Object light entering from the lens 102 passes through the iris 103 and forms an image on the image pickup element 104 such as a CCD. This object light image is photoelectrically converted by the image pickup element 104 and output as a video signal to the outside of the lens unit 101. This photoelectrically converted video signal passes through the CDS 105 and the AGC 106 and is supplied to the camera signal processing unit 107 and the gate circuit 108 for setting a photometry area.

A luminance signal in the corresponding photometry area is detected and separated from the video signal supplied to the gate circuit 108. This luminance signal is supplied to the integral circuit 109 where the signal is integrated. The integrated luminance signal is converted into a digital signal by the A/D converter 110 and supplied as an exposure evaluation signal to the camera control unit 113.

On the basis of the supplied luminance integral data, the camera control unit 113 determines exposure and controls the timing generator (TG) 111 for controlling the shutter speed of the image pickup element (CCD) 104, the iris control circuit 112, and the AGC 106, so that exposure is appropriate.

Figure 4:
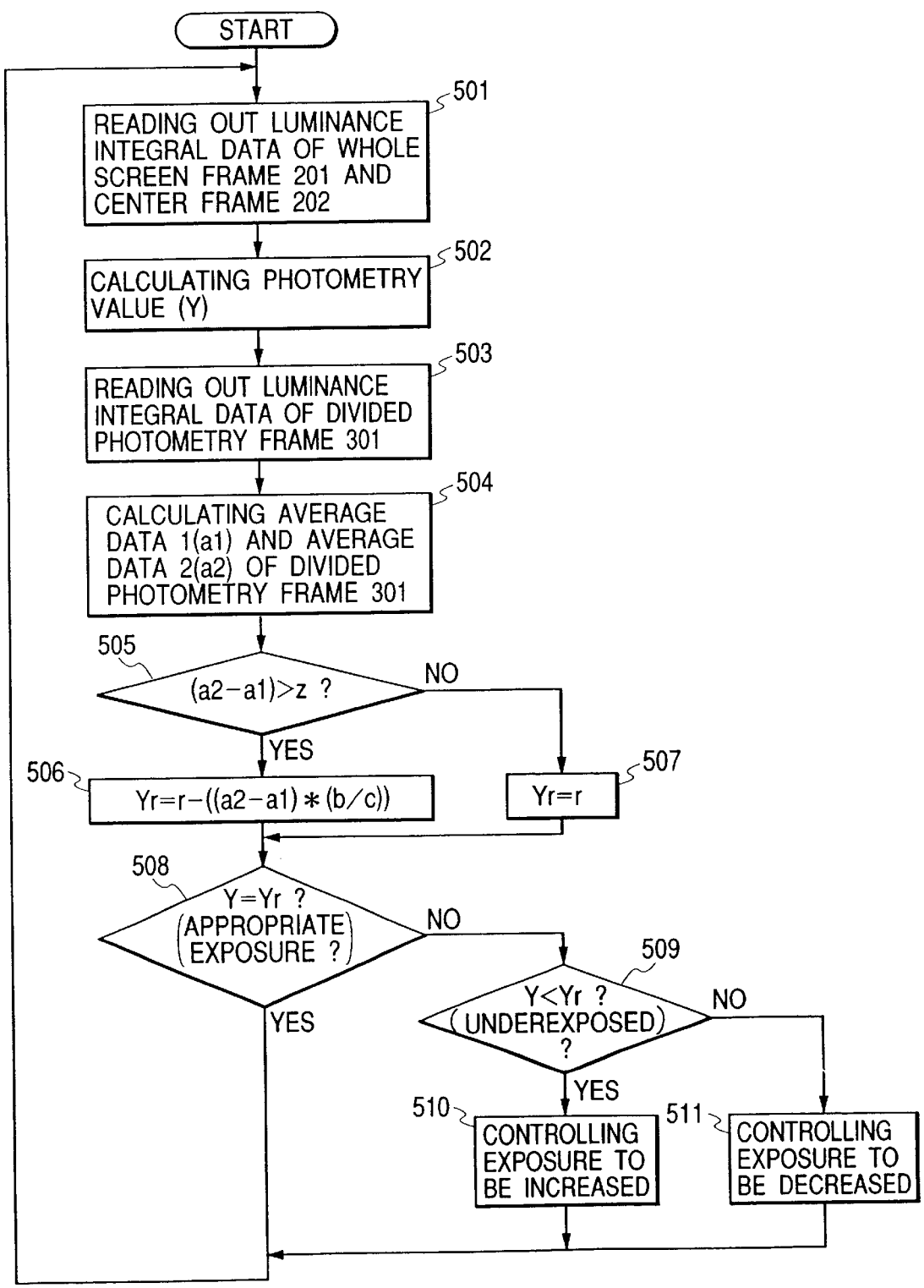
FIG. 4 is a flow chart showing the exposure control operation of a camera control unit in the first embodiment of the image pickup apparatus of the present invention.

The first embodiment of the present invention will be described below with reference to FIG. 4. FIG. 4 is a flow chart showing the exposure control operation of the camera control unit 113 in the first embodiment of the image pickup apparatus of the present invention.

Figure 5:
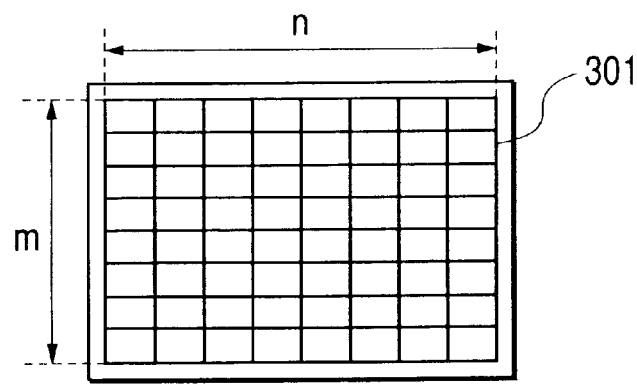
FIG. 5 is a view for explaining the exposure control operation of the image pickup apparatus of the present invention.

In this embodiment, as shown in FIG. 5, a whole screen as an image pickup range of the image pickup element 104 is divided into a mesh size (m×n) composed of 8×8=64 divided photometry frames. The number x of divided photometry frames of sampling used in photometry is 16. FIG. 5 is a view for explaining the exposure control operation of the image pickup apparatus of the present invention. Each of m and n is an integer of 2 or more, and the number x of frames of sampling is an integer larger than 1 and smaller than (m×n).

Figure 1:
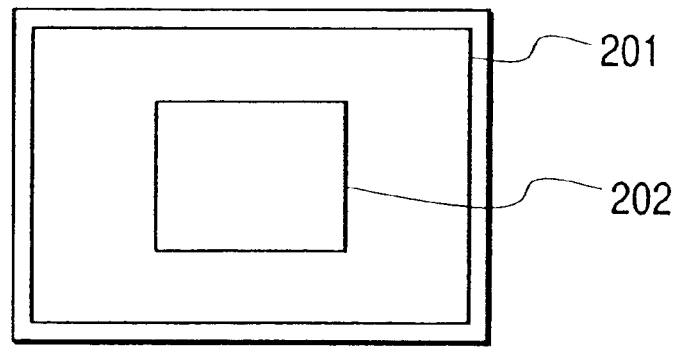
FIG. 1 is view for explaining the exposure control operation of a conventional image pickup apparatus.
Figure 2:
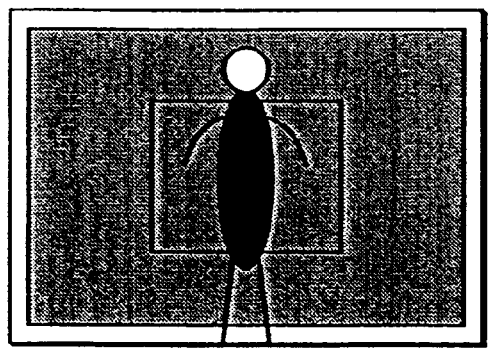
FIG. 2 is a view for explaining the exposure control operation of the conventional image pickup apparatus.

First, the camera control unit 113 reads out luminance integral data, integrated by the integral circuit 109, of each of a whole screen frame 201 and a center frame 202 shown in FIG. 1 (step 501). The camera control unit 113 calculates a screen photometry value Y from these readout luminance integral data of the whole screen frame 201 and the center frame 202 (step 502). The method of calculating the screen photometry value Y is the same as the conventional method (i.e., known to those skilled in the art) and is changed in accordance with, e.g., the characteristics (configuration) of an image pickup apparatus. Therefore, a detailed description of the method will be omitted.

Subsequently, the camera control unit 113 reads out luminance integral data of all (64) divided photometry frames 301 shown in FIG. 5 (step 503). On the basis of the readout luminance integral data of all (64) the divided photometry frames 301, the camera control unit 113 calculates an average value a1 of the luminance integral data of the 64 frames and an average value a2 of the luminance integral data of 16 frames sampled by the number x of frames in descending order of luminance (step 504).

In step 505, the camera control unit 113 checks whether the value of (a2−a1) is larger than a threshold value z. If the camera control unit 113 determines in step 505 that the value of (a2−a1) is smaller than the threshold value z, the camera control unit 113 sets an appropriate exposure target value Yr to a prescribed value r, which is set on the basis of the threshold value z (step 507). Note that the threshold value z is a value (positive real number) determined on the basis of the characteristics (configuration) of an image pickup apparatus, e.g., the diameter of a lens or the number of pixels of an image pickup element.

If the camera control unit 113 determines in step 505 that the value of (a2−a1) is larger than the threshold value z, the camera control unit 113 sets a new appropriate exposure target value Yr by equation (1) shown below (step 506).

$$Yr = r - \{(a2-a1) \times (b/c)\} \quad (1)$$

where b and c are correction coefficients. These values adjust the effect of correction.

Figure 6:
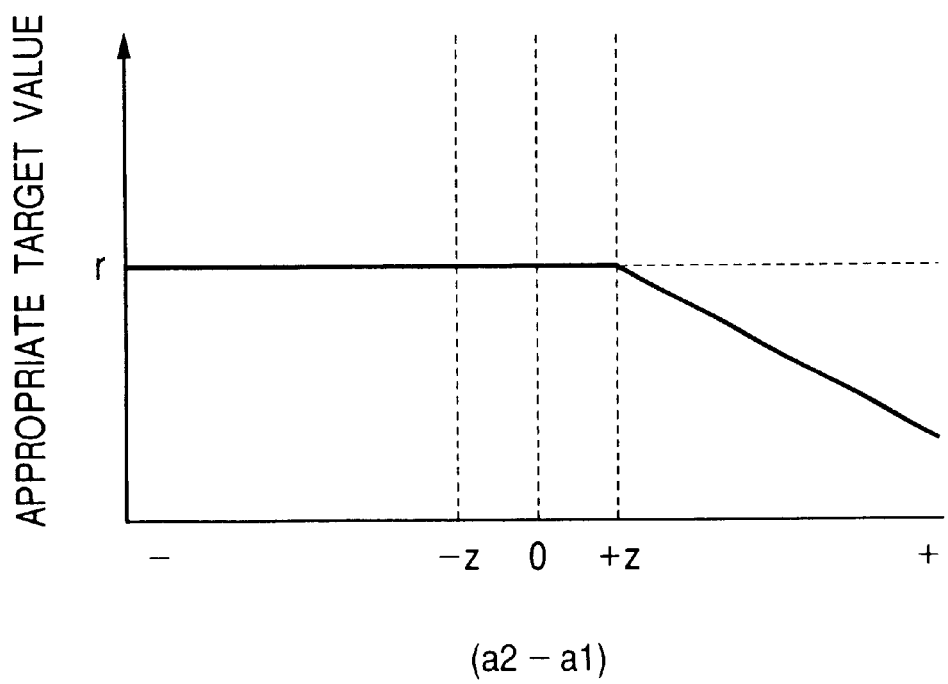
FIG. 6 is a graph showing a change in an appropriate target value as a function of the value of (a2−a1) in the first embodiment.

FIG. 6 shows a change in the appropriate target value as a function of the value of (a2−a1) in this control (steps 505, 506, and 507). That is, FIG. 6 is a graph showing a change in the appropriate target value as a function of the value of (a2−a1) in the first embodiment. As described above, the appropriate target value takes a fixed value (the prescribed value r) when the value of (a2−a1) is smaller than the threshold value z. When the value of (a2−a1) is larger than the threshold value z, the appropriate target value monotonically reduces in accordance with equation (1).

After setting the appropriate target value Yr by the above processing, the camera control unit 113 controls the iris 103, the shutter speed, the AGC 106, and the like on the basis of the exposure state as in conventional apparatuses, thereby controlling exposure such that exposure (the screen photometry value Y) equals the appropriate target value Yr (steps 508, 509, 510, and 511).

Figure 7:
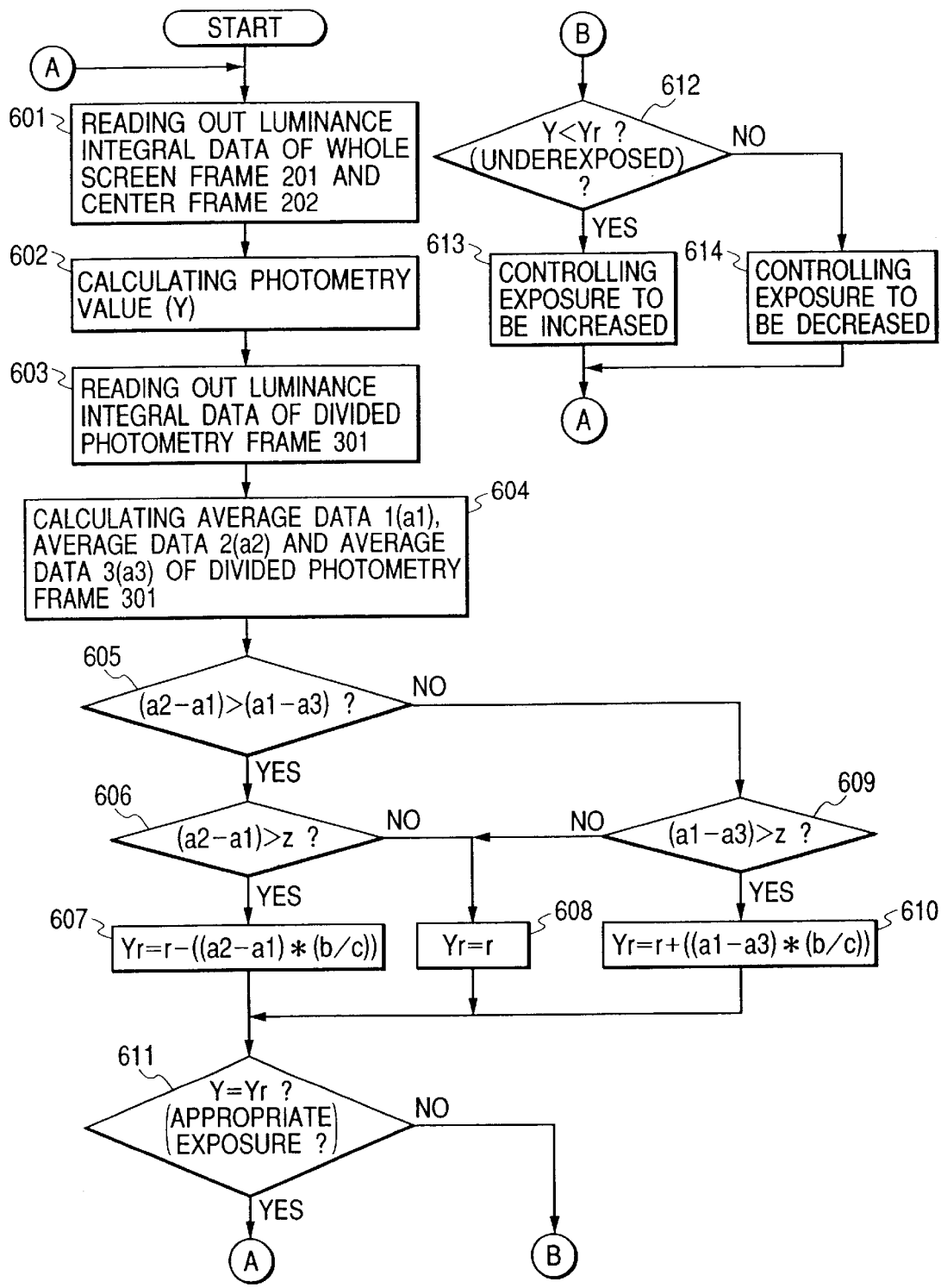
FIG. 7 is a flow chart showing the exposure control operation of a camera control unit 113 in the second embodiment of the image pickup apparatus of the present invention.

The second embodiment of the present invention will be described below with reference to FIG. 7. FIG. 7 is a flow chart showing the exposure control operation of a camera control unit 113 in the second embodiment of the image pickup apparatus of the present invention.

As in the first embodiment, as shown in FIG. 5, a whole screen as an image pickup range of an image pickup element 104 is divided into a mesh size (m×n) composed of 8×8=64 divided photometry frames. The number x of divided photometry frames used in photometry is 16. Each of m and n is an integer of 2 or more, and the number x of frames of sampling is an integer larger than 1 and smaller than (m×n).

First, the camera control unit 113 reads out luminance integral data, integrated by an integral circuit 109, of each of a whole screen frame 201 and a center frame 202 shown in FIG. 1 (step 601). The camera control unit 113 calculates a screen photometry value Y from these readout luminance integral data of the whole screen frame 201 and the center frame 202 (step 602). The method of calculating the screen photometry value Y is the same as the conventional method (i.e., known to those skilled in the art) and is changed in accordance with, e.g., the characteristics (configuration) of an image pickup apparatus. Therefore, a detailed description of the method will be omitted.

Subsequently, the camera control unit 113 reads out luminance integral data, integrated by the integral circuit 109, of all (64) divided photometry frames 301 shown in FIG. 5 (step 603). On the basis of the readout luminance integral data of all (64) the divided photometry frames 301, the camera control unit 113 calculates an average value a1 of the luminance integral data of the 64 frames, an average value a2 of the luminance integral data of 16 frames sampled by the number x of frames in descending order of luminances, and an average value a3 of the luminance integral data of 16 frames sampled by the number x of frames in ascending order of luminances (step 604).

In step 605, the camera control unit 113 checks which of the value of (a2−a1) and the value of (a1−a3) is larger. If in step 605 the value of (a2−a1) is larger than the value of (a1−a3), the camera control unit 113 checks in step S606 whether the value of (a2−a1) is larger than a threshold value z. If the camera control unit 113 determines in step S606 that the value of (a2−a1) is smaller than the threshold value z, the camera control unit 113 sets an appropriate exposure target value Yr to a prescribed value r, which is set on the basis of the threshold value z (step 608). Note that the threshold value z is a value (positive real number) which is determined on the basis of the characteristics (configuration) of an image pickup apparatus, e.g., the diameter of a lens or the number of pixels of an image pickup element.

If the camera control unit 113 determines in step 606 that the value of (a2−a1) is larger than the threshold value z, the camera control unit 113 sets a new appropriate exposure target value Yr by equation (2) shown below (step 607).

$$Yr=r-\{(a2-a1)\times(b/c)\} \quad (2)$$

where b and c are correction coefficients. These values adjust the effect of correction.

On the other hand, if in step 605 the value of (a1−a2) is smaller than the value of (a1−a3), the camera control unit 113 checks in step 609 whether the value of (a1−a3) is larger than the threshold value z. If the camera control unit 113 determines in step 609 that the value of (a1−a3) is smaller than the threshold value z, the camera control unit 113 sets the appropriate exposure target value Yr to the prescribed value r, which is set on the basis of the threshold value z (step 608).

If the camera control unit 113 determines in step 609 that the value of (a1−a3) is larger than the threshold value z, the camera control unit 113 sets a new appropriate exposure target value Yr in accordance with equation (3) shown below (step 610).

$$Yr=r+\{(a1-a3)\times(b/c)\} \quad (3)$$

where b and c are correction coefficients. These values adjust the effect of correction.

FIG. 8 shows a change in the appropriate target value as a function of the value of (a2−a1) in this control (steps 605, 606, 607, 608, 609, and 610). That is, FIG. 8 is a graph showing a change in the appropriate target value as a function of the value of (a2−a1) in the second embodiment.

As described above, the appropriate target value takes a fixed value (the prescribed value r) when the value of (a2−a1) is smaller than the value of (a1−a3) and the value of (a2−a1) is smaller than the threshold value z. When the value of (a2−a1) is larger than the threshold value z, the appropriate target value monotonically reduces in accordance with equation (2).

Also, the appropriate target value takes a fixed value (the prescribed value r) when the value of (a2−a1) is larger than the value of (a1−a3) and the value of (a1−a3) is smaller than the threshold value z. When the value of (a1−a3) is larger than the threshold value z, the appropriate target value monotonically increases in accordance with equation (3).

After setting the appropriate target value Yr by the above processing, the camera control unit 113 controls an iris 103, the shutter speed, an AGC 106, and the like on the basis of the exposure state as in conventional apparatuses, thereby controlling exposure such that exposure (the screen photometry value Y) equals the appropriate target value Yr (steps 611, 612, 613, and 614).

In the first and second embodiments described above, excessive underexposure or overexposure of an object can be prevented on the basis of the tendency of the contrast distribution in a whole screen, while a central portion of the screen is emphasized. Therefore, even when objects having extremely different luminance contrasts exist in the same screen, a suitable object can be photographed.

Also, in the above first and second embodiments, an image pickup apparatus having divided photometry frames in the form of a mesh (m×n) has been explained. However, an image pickup apparatus can also have divided photometry frames in the form of a line (1×n: n is an integer of 3 or more).

The first and second embodiments described above can be applied to a system constituted by a plurality of devices or to an apparatus comprising a single device. Also, the present invention includes a case in which program codes of software for achieving the functions of the above embodiments are supplied to an internal computer of an apparatus or system connected to various devices to operate these devices in order to realize the functions of the embodiments, and the devices are operated in accordance with the programs stored in the computer (CPU or MPU) of the system or apparatus.

In this case, the program codes of the software realize the functions of the above embodiments, so the program codes themselves and a means for supplying the program codes to the computer, e.g., a storage medium storing the program codes constitute the present invention. As this storage medium for storing the program codes, it is possible to use, e.g., a floppy disk, hard disk, optical disk, magnetooptical disk, CD-ROM, magnetic tape, nonvolatile memory card, or ROM.

Furthermore, besides a computer realizes the functions of the above embodiments by executing program codes supplied to the computer, the embodiments of the present invention include program codes which realize the functions of the embodiments in cooperation with an OS (Operating System) or another application software running on the computer.

Furthermore, the present invention also includes a case where, after supplied program codes are stored in a memory of an internal function extension board of a computer or in a memory of a function extension unit connected to the computer, a CPU or the like of the function extension board or function extension unit executes a part or the whole of actual processing on the basis of instructions by the program codes, and the functions of the above embodiments are realized by the processing.

Note that the shapes and structures of the individual parts described in the above embodiments show merely a few practical examples in carrying out the present invention. Therefore, the technical scope of the present invention should not be limitedly interpreted by these embodiments. That is, the present invention can be practiced in diverse forms without departing from the spirit and principal characteristic features of the invention.

In the first and second embodiments as have been described above, while a central portion of the screen is accentuated, excessive underexposure or overexposure of an object can be prevented by correcting the appropriate target value of exposure control in accordance with the tendency of the luminance distribution in divided photometry frames in the screen. Accordingly, even when objects having extremely different luminance contrasts exist in the same screen, a suitable object can be photographed.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image pickup apparatus comprising:
an image pickup region including a plurality of divided photometry frames;
first calculating means for calculating an average value a1 of a predetermined number of divided photometry frames in said image pickup region;
second calculating means for calculating an average value a23 of a smaller number of divided photometry frames than the predetermined number in said image pickup region; and
exposure control means for controlling exposure by using signals from said first and second calculating means,
wherein the average value a23 includes an average value a2 of x divided photometry frames sampled in descending order of luminances from said predetermined number of divided photometry frames;
wherein said exposure control means corrects an appropriate target value Yr of exposure control by using the average values a1 and a2, and
wherein when a difference between the average values a1 and a2 exceeds a predetermined threshold value z, said exposure control means performs correction of decreasing the appropriate target value Yr of exposure control in accordance with a value of (a2−a1).

2. An apparatus according to claim 1, wherein the correction of decreasing the appropriate target value Yr of exposure control in accordance with the value of (a2−a1) is performed on the basis of $$Yr=r-\{(a2-a1)\times(b/c)\} \quad (1)$$

where b and c are correction coefficients and r is a prescribed value set on the basis of the threshold value z.

3. An image pickup apparatus comprising:
an image pickup region including a plurality of divided photometry frames;
first calculating means for calculating an average value a1 of a predetermined number of divided photometry frames in said image pickup region;
second calculating means for calculating an average value a23 of a smaller number of divided photometry frames than the predetermined number in said image pickup region; and
exposure control means for controlling exposure by using signals from said first and second calculating means,
wherein the average value a23 includes an average value a3 of y divided photometry frames sampled in ascending order of luminances from said predetermined number of divided photometry frames,
wherein said exposure control means corrects an appropriate target value Yr of exposure control by using the average values a1 and a3, and
wherein when a difference between the average values a1 and a3 exceeds a predetermined threshold value z, said exposure control means performs correction of increasing the appropriate target value Yr of exposure control in accordance with a value of (a1−a3).

4. An apparatus according to claim 3, wherein the correction of increasing the appropriate target value Yr of exposure control in accordance with the value of (a1−a3) is performed on the basis of $$Yr=r+\{(a1-a3)\times(b/c)\} \quad (3)$$

where b and c are correction coefficients and r is a prescribed value set on the basis of the threshold value z.

5. An image pickup apparatus comprising:
an image pickup region including a plurality of divided photometry frames;
first calculating means for calculating an average value a1 of a predetermined number of divided photometry frames in said image pickup region;
second calculating means for calculating an average value a23 of a smaller number of divided photometry frames than the predetermined number in said image pickup region; and
exposure control means for controlling exposure by using signals from said first and second calculating means,
wherein the average value a23 includes an average value a2 of x divided photometry frames sampled in descending order of luminances from said predetermined number of divided photometry frames, and an average value a3 of y divided photometry frames sampled in ascending order of luminances from said predetermined number of divided photometry frames,
wherein said exposure control means corrects an appropriate target value Yr of exposure control by using the average values a1, a2, and a3, and
wherein when a larger one of a difference between the average values a1 and a2 and a difference between the average values a1 and a3 exceeds a predetermined threshold value z, said exposure control means performs correction of increasing or decreasing the appropriate target value Yr of exposure control in accordance with a value of (a2−a1) or (a1−a3).

6. An apparatus according to claim 5, wherein when the value of (a2−a1) is larger than the value of (a1−a3) and exceeds the predetermined threshold value z, the correction of decreasing the appropriate target value Yr of exposure control in accordance with the value of (a2−a1) is performed on the basis of $$Yr=r-\{(a2-a1)\times(b/c)\} \quad (2)$$

where b and c are correction coefficients and r is a prescribed value set on the basis of the threshold value z.

7. An apparatus according to claim 5, wherein when the value of (a2−a1) is smaller than the value of (a1−a3) and the value of (a1−a3) exceeds the predetermined threshold value z, the correction of increasing the appropriate target value Yr of exposure control in accordance with the value of (a1−a3) is performed on the basis of $$Yr = r + \{(a1-a3) \times (b/c)\} \qquad (3)$$

where b and c are correction coefficients and r is a prescribed value set on the basis of the threshold value z.

* * * * *

UNITED STATES PATENT AND TRADEMARK OFFICE
CERTIFICATE OF CORRECTION

PATENT NO. : 6,831,696 B1
DATED : December 14, 2004
INVENTOR(S) : Saeki, Takayuki It is certified that error appears in the above-identified patent and that said Letters Patent is hereby corrected as shown below:

Title page,
Item [*] Notice, should read, -- Subject to any disclaimer, the term of this patent is extended or adjusted under 35 U.S.C. 154(b) by 901 days. --.

Signed and Sealed this

Sixth Day of September, 2005

JON W. DUDAS
*Director of the United States Patent and Trademark Office*